US009782996B1

(12) United States Patent
Kuo

(10) Patent No.: US 9,782,996 B1
(45) Date of Patent: Oct. 10, 2017

(54) VERTICAL FILE ORGANIZING ASSEMBLY

(71) Applicant: EP Family Corp., Walnut, CA (US)

(72) Inventor: Hung-Chih Kuo, Walnut, CA (US)

( * ) Notice: Subject to any disclaimer, the term of this patent is extended or adjusted under 35 U.S.C. 154(b) by 0 days.

(21) Appl. No.: 15/368,471

(22) Filed: Dec. 2, 2016

(51) Int. Cl.

| | |
|---|---|
| ***A47F 3/14*** | (2006.01) |
| ***A47F 5/14*** | (2006.01) |
| ***A47F 7/14*** | (2006.01) |
| ***A47J 47/00*** | (2006.01) |
| ***B42F 7/12*** | (2006.01) |
| ***A47B 47/02*** | (2006.01) |
| ***A47B 55/02*** | (2006.01) |
| ***A47B 81/00*** | (2006.01) |
| ***A47B 96/02*** | (2006.01) |
| ***A47F 5/01*** | (2006.01) |

(Continued)

(52) U.S. Cl.

CPC .............. *B42F 7/12* (2013.01); *A47B 47/027* (2013.01); *A47B 55/02* (2013.01); *A47B 57/10* (2013.01); *A47B 81/00* (2013.01); *A47B 96/02* (2013.01); *A47F 5/0031* (2013.01); *A47F 5/01* (2013.01); *A47F 7/148* (2013.01)

(58) Field of Classification Search

CPC .. B42F 7/12; B42F 15/005; B42F 7/10; A47B 47/027; A47B 55/02; A47B 81/00; A47B 96/02; A47B 87/0207; A47B 87/0269; A47B 87/0276; A47B 47/021; A47B 57/06; A47B 57/08; A47B 57/10; A47B 57/12; A47B 63/00; A47B 87/00; A47B 87/001; A47B 87/02; A47B 87/0215; A47B 87/0261; A47B 87/0284; A47B 87/0292; A47F 5/0025; A47F 5/0031; A47F 5/01; A47F 5/13; A47F 5/135; A47F 5/14; A47F 5/00; A47F 5/0018; A47F 5/0043; A47F 5/0056; A47F 2005/165; A47F 7/0007; A47F 7/145; A47F 7/0014; A47F 7/148

USPC ...... 211/11, 10, 126.13, 133.5, 133.1, 133.2, 211/133.3, 128.1, 126.2, 126.1, 126.9, 211/181.1, 49.1, 50, 52, 189, 186, 187, 211/190, 188, 194

See application file for complete search history.

(56) References Cited

U.S. PATENT DOCUMENTS 2,309,435 A * 1/1943 Bitney .................... A47F 5/135 211/128.1
3,149,727 A * 9/1964 Magers ................... A47F 7/144 211/133.1

(Continued)

*Primary Examiner* — Jennifer E. Novosad

(74) *Attorney, Agent, or Firm* — Tommy SF Wang; Wang IP Law Group, P.C.

(57) ABSTRACT

A collapsible file organizing assembly retains flat items in an organized disposition through vertical arrangement of tiered, sloped shelves that organize item. A pair of side frames carry panels, channels, crossbars, and fastening mechanisms. The panels easily disassemble and collapse for stowage. The side frames have a top bar, a bottom bar, a straight lateral bar, and a bent lateral bar. A plurality of sleeves join with the straight lateral bar so that a rear panel can be slidably pulled out or into the sleeves. A base panel forms the lowermost surface of the assembly. A plurality of channels extend between the straight lateral bar and the bent lateral bar at an angle. The channels provide a slidable surface that receives shelves. The shelves slidably engage the channels to form a tiered, sloped arrangement. A rear shaft on the shelves abuts against rails disposed along the rear panel.

20 Claims, 12 Drawing Sheets

(51) Int. Cl.
*A47B 57/10* (2006.01)
*A47F 5/00* (2006.01)

(56) References Cited

U.S. PATENT DOCUMENTS

| | | | | | | |
|---|---|---|---|---|---|---|
| 3,232,442 | A | * | 2/1966 | Wilson | A47F 5/01 | 211/126.15 |
| 3,435,958 | A | * | 4/1969 | Chesley | A47F 5/0031 | 108/107 |
| 3,487,951 | A | * | 1/1970 | Beltzung | A47F 5/01 | 211/133.2 |
| 3,704,791 | A | * | 12/1972 | Young, Jr. | A47B 87/0269 | 206/509 |
| 3,915,097 | A | * | 10/1975 | Young, Jr. | A47F 5/12 | 108/163 |
| 4,099,735 | A | * | 7/1978 | Becker, III | B62L 35/0006 | 211/133.2 |
| 4,819,899 | A | * | 4/1989 | Weil | A47F 13/085 | 211/133.2 |
| 4,978,013 | A | * | 12/1990 | Hogg | A47F 5/13 | 211/132.1 |
| 5,111,944 | A | * | 5/1992 | Ostermeyer | A47F 5/0025 | 211/126.1 |
| 5,253,770 | A | * | 10/1993 | Rosenthal | A47F 5/0025 | 211/106 |
| 5,299,698 | A | * | 4/1994 | Gay | A47B 55/02 | 108/193 |
| 5,810,176 | A | * | 9/1998 | Stravitz | A47B 63/00 | 211/11 |
| 5,996,812 | A | * | 12/1999 | Sokol, Jr. | B42F 7/10 | 211/11 |
| 6,315,308 | B1 | * | 11/2001 | Konopka | A47B 21/00 | 108/50.02 |
| 6,431,377 | B1 | * | 8/2002 | Lechman | A47B 21/007 | 211/133.2 |
| 6,659,294 | B1 | * | 12/2003 | Simard | A47F 5/01 | 108/147.11 |
| D524,573 | S | * | 7/2006 | Robinson | D6/675.4 | |
| D757,176 | S | * | 5/2016 | Tsai | D19/92 | |

* cited by examiner

VERTICAL FILE ORGANIZING ASSEMBLY

FIELD OF THE INVENTION

The present invention relates generally to a vertical file organizing assembly. More so, the present invention relates to a file organizing assembly that provides a file organizer in which at least one flat item, such as files or paper documents, are supported in a vertical arrangement through a tiered series of adjacent, sloped shelves to help organize and enhance visibility of the items; whereby the file organizing assembly comprises various panels, side frames, crossbars, and shelves that slide and interlock together to form a vertical organizing structure, and also slidably disassemble for stowage and shipping.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, desk organizers are a popular office item which allow a user easy access to commonly used office items. Additionally, file trays are commonly used to organize the flow of paper work within an office. For example, desk trays are often utilized both to coordinate the flow of paper as well as to organize files based on various classifications.

Often, a locker is a small, usually narrow storage compartment. They are commonly found in dedicated cabinets, very often in large numbers, in various public places such as locker rooms, workplaces, middle, and high schools, transport hub and the like. One type of organizing locker is a tray or a file trough for holding letters and envelopes in vertical, tiered arrangement and adapted for desktop use.

Generally, a file folder is a kind of folder that holds loose papers and money together for organization and protection. File folders usually consist of a sheet of heavy paper stock or other thin, but stiff, material which is folded in half, and are used to keep paper documents. Files may also contain other things like magazine, cased in music CD's, and the like.

Typically, wire racks and shelves consists of wire mesh supported by metal supports and is intended to be load-bearing. The mesh is usually welded to the supports, but may be attached in other ways as well. In commercial and industrial applications, the wire mesh usually has a minimum wire gauge of 0.105 inches when round wire is used.

There are numerous types, styles, constructions, and arrangements of filing units which are adapted to be placed on a desk, bookcase, or the like, which have a plurality of spaced, tiered shelves for holding various materials such as letters, envelopes, stationery and incoming and outgoing mail. These filing units are formed of a variety of materials, such as wood, metal, plastic, or a combination thereof.

Other proposals have involved file organizing. The problem with these storage trays is that they do not provide easy visibility and access to the files, and are not collapsible for stowage. Even though the above cited filing organizers meets some of the needs of the market, a vertical file organizing assembly that holds at least one flat item in an organized manner and in a vertical arrangement through a tiered series of adjacent, sloped shelves, and various panels, side frames, crossbars, and shelves that slide and interlock together to form a vertical organizing structure, and also slidably disassemble for stowage and shipping, is still desired.

SUMMARY

Illustrative embodiments of the disclosure are generally directed to a vertical file organizing assembly that retains least one flat item, such as a file or a paper document, in an organized, easily visible disposition. The assembly provides support for the items through a vertical arrangement of tiered, sloped shelves that organize item so as to enhance visibility and accessibility.

In some embodiments, the vertical file organizing assembly comprises a variety of interlocking panels, side frames, crossbars, and shelves. The shelves slide along channels and interlock with rails to form a sloped, tiered arrangement of shelves. The panels assemble by interconnecting to the side frames through friction fit relationship and fasteners. The panels disassemble from the side frames to a collapsed position for stowage and shipping.

In some embodiments, the vertical file organizing assembly may include a pair of side frames. The side frames form the supportive foundation of the assembly, carrying the various panels, channels, crossbars, and fastening mechanisms. In one embodiment, two side frames form a mirror image, resting parallel to each other while supporting the components of the assembly.

The pair of side frames are defined by a top bar, a bottom bar, a straight lateral bar, and a bent lateral bar. The bars join in a coplanar relationship, so as to form a generally tapered, rectangular shape. The bent lateral bar deviates the rectangular shape, so as to form a wider lower end for the side frames.

In some embodiments, the assembly may include a plurality of sleeves configured to join with the straight lateral bar in a generally parallel relationship. The sleeves are configured to receive a rear panel, described below. The sleeves may be disposed in a vertical orientation so that the rear panel can be slidably pulled out or slid into the sleeves.

In some embodiments, the assembly may include a pair of frame bars that enhance structural integrity of the side frames and also provide a mounting surface for a pair of top crossbars, discussed below. The frame bars are defined by a plurality of holes. In one embodiment, the frame bars extend between the straight lateral bar and the bent lateral bar at an angle, such that the frame bars slope down from the bent lateral bar to the straight lateral bar.

In some embodiments, the assembly may include a pair of top crossbars that are configured to extend between the frame bars. The top crossbars may include a threaded top termini that is in general alignment with the holes formed in the frame bars. The top crossbars are disposed in a parallel, spaced-apart relationship when traversing the side frames, so as to enhance structural integrity of the assembly.

In some embodiments, the assembly may include at least one flange defined by at least one aperture. The flange is configured to join with the bottom bar. The aperture in the flange provides a passage for passing at least one fastener through. The fastener is used to connect a pair of bottom crossbars across the side frames.

The bottom crossbars extend between the pair of side frames at the bottom bar. The bottom crossbars may include a threaded bottom termini that is in general alignment with the at least one aperture formed in the flange. The bottom crossbars are disposed in a parallel, spaced-apart relationship when traversing the side frames, so as to enhance structural integrity of the assembly.

In some embodiments, the assembly may include a plurality of feet configured to join with the bottom bar. The feet rest on a ground surface to help stabilize the assembly.

In some embodiments, the assembly may include a base panel. The base panel forms the lowermost surface of the assembly. The base panel is defined by a pair of side edges, a rear edge, a front edge, and a base wire mesh disposed between the edges. The base panel is configured to rest over the pair of bottom crossbars in a generally coplanar relationship. The base panel may be used to carry at least one item in a horizontal disposition, serving as a supplemental shelf with the sloped shelves.

In some embodiments, the assembly may include a rear panel defined by a pair of lateral edges, a top edge, a bottom edge, and a rear wire mesh disposed between the edges. The rear panel is disposed to extend generally perpendicular between the pair of side frames. The rear panel assembles and disassembles from the assembly through the slidable engagement with the plurality of sleeves along the straight lateral bar.

In some embodiments, the assembly comprises a plurality of channels configured to extend between the straight lateral bar and the bent lateral bar at an angle. In this manner, the channels slope down from the bent lateral bar to the straight lateral bar. In one embodiment, the channels are generally parallel with the frame bars. The channels provide a slidable surface that receives a plurality of shelves, described below.

In some embodiments, the assembly may include a plurality of shelves defined by a front shaft, a rear shaft, a pair of lateral shafts, and a shelf wire mesh disposed between the shafts. The shelf wire mesh has sufficient surface area to support the at least one item.

The shelves slidably engage the channels to form a tiered arrangement of sloped shelves. The sliding configuration also enables facilitated removal of at least one of the shelves from the channels, so as to form various combinations of shelving. The pair of lateral shafts on the shelves slidably engage the sloped channels that extend across the lateral bars. The angled disposition of the channels causes the shelves to slope down from the bent lateral bar to the straight lateral bar.

In addition to engaging the channels, the rear shaft of the shelves abuts against a plurality of rails joined with the rear wire mesh of the rear panel. The rails extend between the pair of lateral edges of the rear panel. The rails join with the rear wire mesh in a parallel, spaced-apart relationship. The rails are disposed along the rear wire mesh of the rear panel, so as to receive the rear shaft of the shelves for support. The horizontal disposition of the rails receives the lateral edges of the rear panel in a snug configuration so that slippage by the shelves is inhibited. In this manner, both the channel and rails support the shelves in a sloped disposition. In one embodiment, the wire mesh of the shelves and the base panel has sufficient surface area to carry at least one item, such as paper, files, writing instruments, and office supplies.

In another aspect, the base panel positions over the pair of bottom crossbars.

In another aspect, the bottom bar of the pair of side frames is defined by a convex hump.

In another aspect, the pair of top crossbars are defined by a threaded top termini.

In another aspect, the assembly further comprises at least one fastener configured to pass through the plurality of holes formed in the pair of frame bars and the threaded terminus of the pair of top crossbars for fastening the pair of top crossbars to the pair of frame bars.

In another aspect, the pair of bottom crossbars are defined by a threaded bottom termini.

In another aspect, the at least one fastener is configured to pass through the at least one aperture formed in the flange and a threaded bottom opening of the pair of bottom crossbars for fastening the pair of bottom crossbars to the pair of side frames at the bottom bar.

In another aspect, the at least one fastener comprises a threaded screw.

In another aspect, the pair of top crossbars are disposed at different elevations in correlation to the slope of the pair of frame bars.

In another aspect, the plurality of rails have a generally L-shape.

In another aspect, the plurality of rails comprises five rails.

In another aspect, the plurality of shelves comprises five shelves.

In yet another aspect, the assembly is fabricated from a lightweight metal or polymer.

One objective of the present invention is to organize at least one flat item used in an office environment in a tiered, sloped arrangement of shelves.

Another objective is to configure the relationship between the panels to be collapsible, so that the assembly requires less space for a consumer to store the assembly, and also the shipping and packaging costs are reduced since the assembly requires less space, and therefore less packing material.

Another objective is to provide at least one fastener to enable detachable attachment between the crossbars and the frame bars and side frames.

Another objective is to carry at least one item on the shelves and the base panel.

Yet another objective is to stabilize the assembly with a plurality of rubber feet on the bottom bar of the side frames.

Yet another objective is to collapse the base panel, the pair of side frames, and the rear panel in a coplanar relationship for stowage.

Yet another objective is to assemble the rear panel, the pair of side frames, and the rear panel for containing the at least one item.

Yet another objective is to provide an inexpensive to manufacture collapsible hanging storage assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A vertical file organizing assembly 100 is referenced in FIGS. 1-23. The vertical file organizing assembly 100, hereafter "assembly 100" is configured to organize the flow of paper work within an office. For example, desk trays are often utilized both to coordinate the flow of paper as well as to organize files based on various classifications. The assembly 100 is also collapsible to enable facilitated stowage. In some embodiments, the assembly 100 may be fabricated from a lightweight metal or polymer that facilitates mobility, construction, and disassembly.

Figure 1:
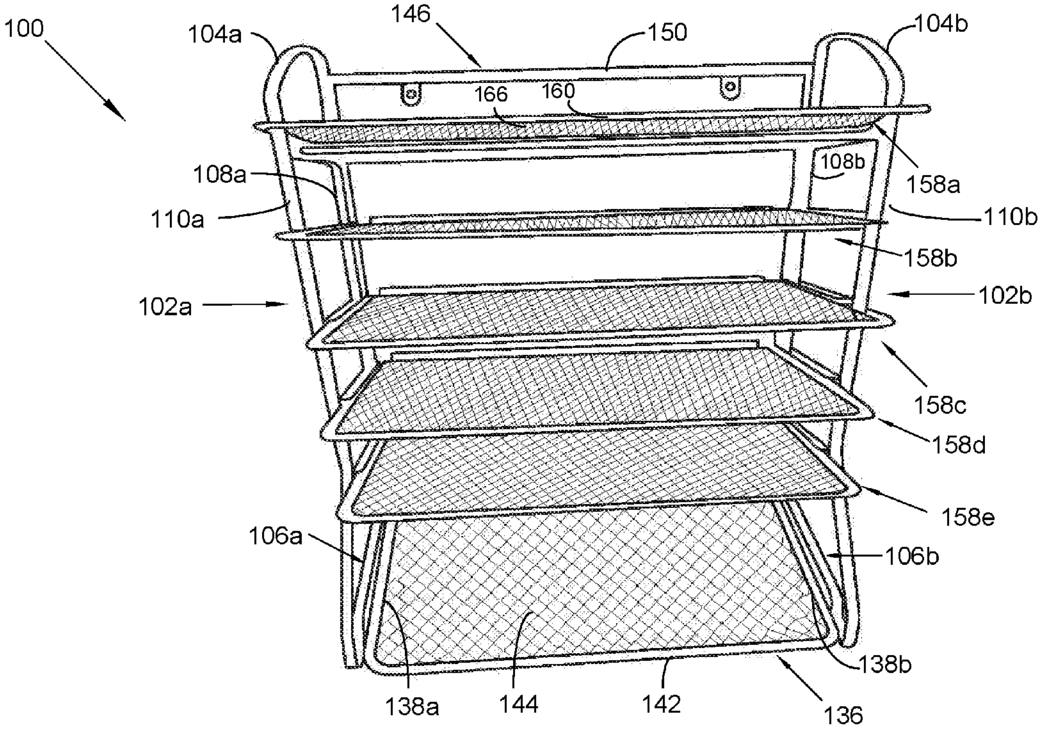
FIG. 1 illustrates a front perspective view of an exemplary vertical file organizing assembly, in accordance with an embodiment of the present invention.
Figure 4:
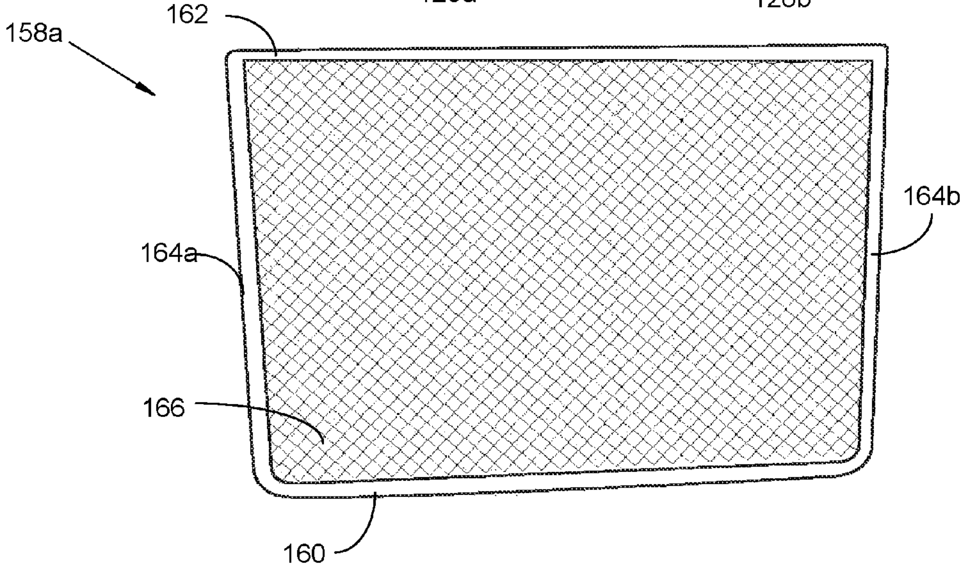
FIG. 4 illustrates a front perspective view of an exemplary shelf, in accordance with an embodiment of the present invention.
Figure 5:
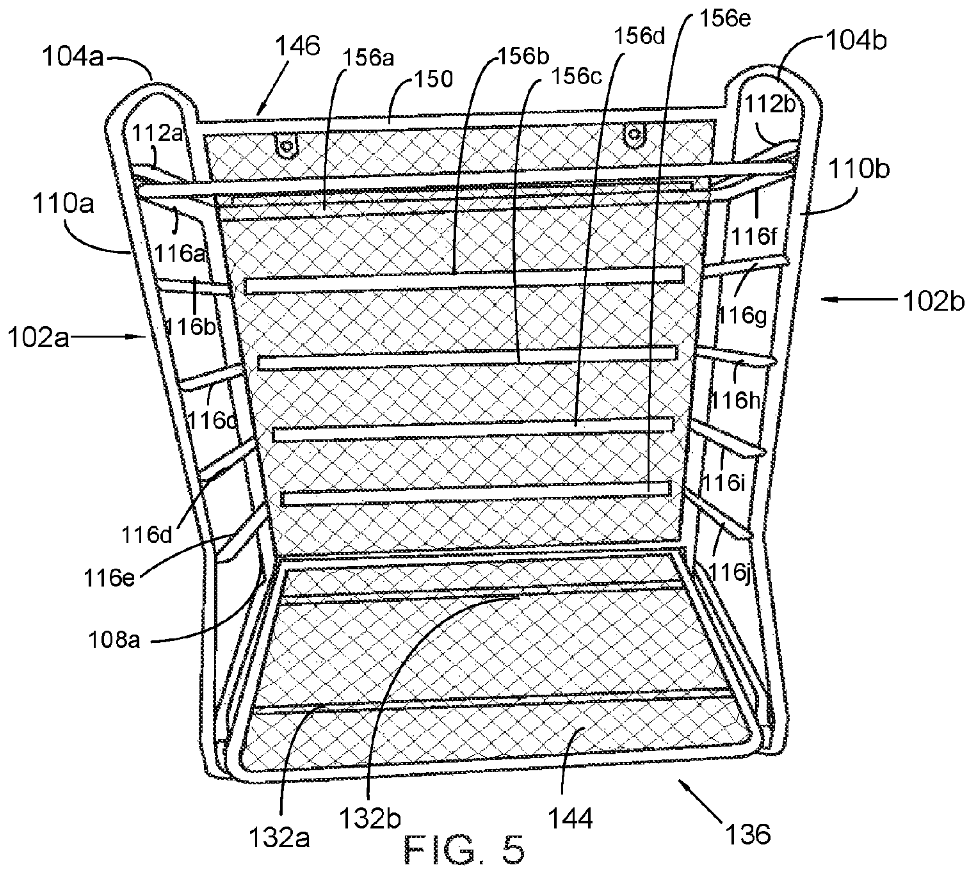
FIG. 5 illustrates a front perspective view of a vertical file organizing assembly with the shelves removed, in accordance with an embodiment of the present invention.

As referenced in FIG. 1, the assembly 100 organizes at least one flat item. The item may include, without limitation, a file, a document, a writing instrument, a music CD, a DVD, a data storage device, and a paper document. The items are arranged and accessible in an organized, and easily visible disposition. In some embodiments, the assembly 100 retains the at least one item through a vertical arrangement of tiered, sloped shelves 158*a-e* that organize the item so as to enhance visibility and accessibility (FIG. 4). For example, a user may label each tier for appropriate filing and expedited accessibility.

Figure 2:
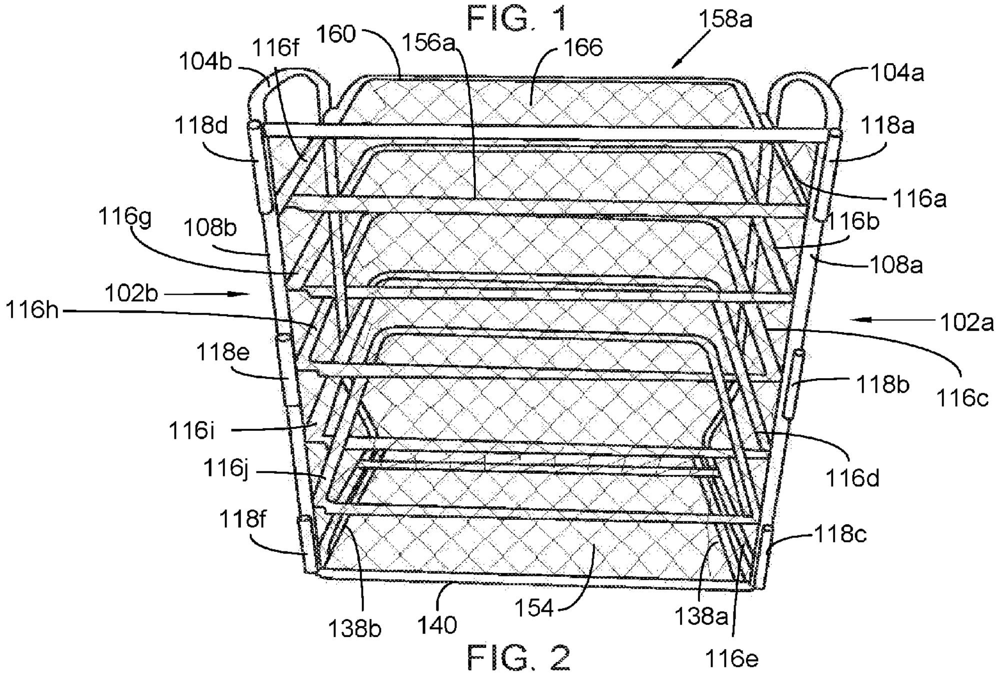
FIG. 2 illustrates a rear perspective view of the vertical file organizing assembly shown in FIG. 1, in accordance with an embodiment of the present invention.
Figure 7:
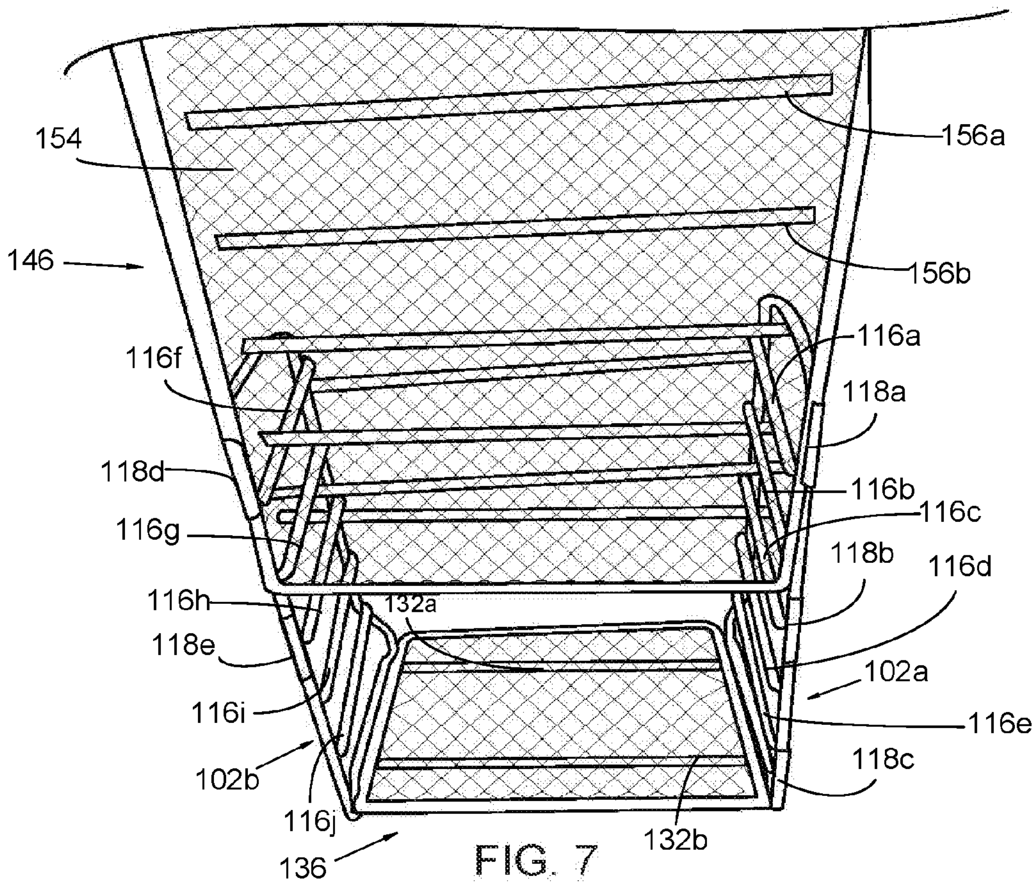
FIG. 7 illustrates a rear perspective view of a vertical file organizing assembly with the shelves removed and the rear panel being slidably removed, in accordance with an embodiment of the present invention.

Turning now to FIG. 2, the assembly 100 comprises a variety of interlocking panels 136, 146, side frames 102*a*, 102*b*, crossbars 120*a-b*, 132*a-b*, and shelves 158*a-e*. The shelves 158*a-e* slide along channels 116*a-j* and interlock with rails 156*a-e* to form a sloped, tiered arrangement of shelves 158*a-e* for supporting items. The panels 136, 146 assemble by interconnecting to the side frames 102*a*, 102*b* through either a slidable relationship, or a friction fit relationship and fasteners 122. FIG. 7 illustrates one exemplary interconnection, in which the panels 136, 146 disassemble from the side frames 102*a*, 102*b* to a collapsed position for stowage and shipping. The rear panel 146 may slidably disengage from the side frames 102*a*, 102*b*, for example.

Figure 3:
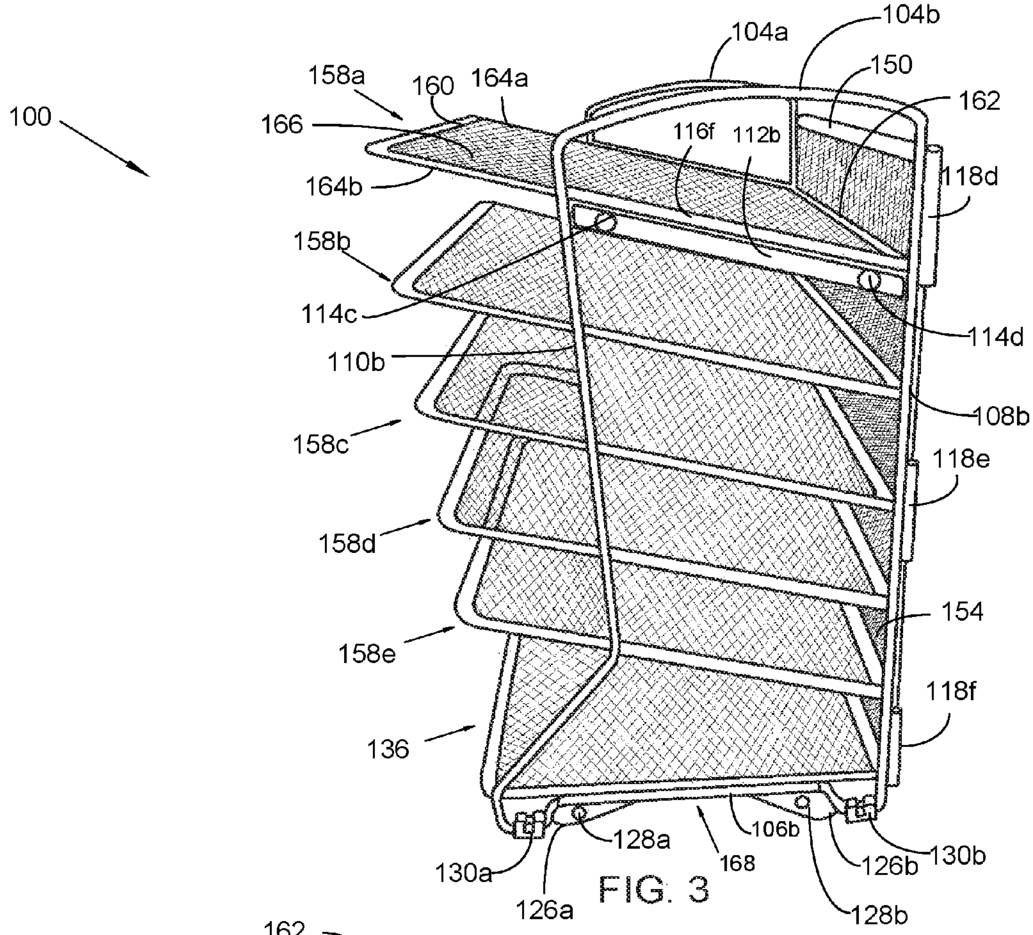
FIG. 3 illustrates a side perspective view of the vertical file organizing assembly shown in FIG. 1, in accordance with an embodiment of the present invention.

As FIG. 3 shows, the assembly 100 may include a pair of side frames 102*a*, 102*b*. The side frames 102*a*, 102*b* form the supportive foundation of the assembly 100, carrying the various panels, channels 116*a-j*, crossbars 120*a-b*, 132*a-b*, and fastening mechanisms. In one embodiment, two side frames 102*a*, 102*b* form a mirror image of each other, resting parallel to each other while supporting the components of the assembly 100.

Figure 19:
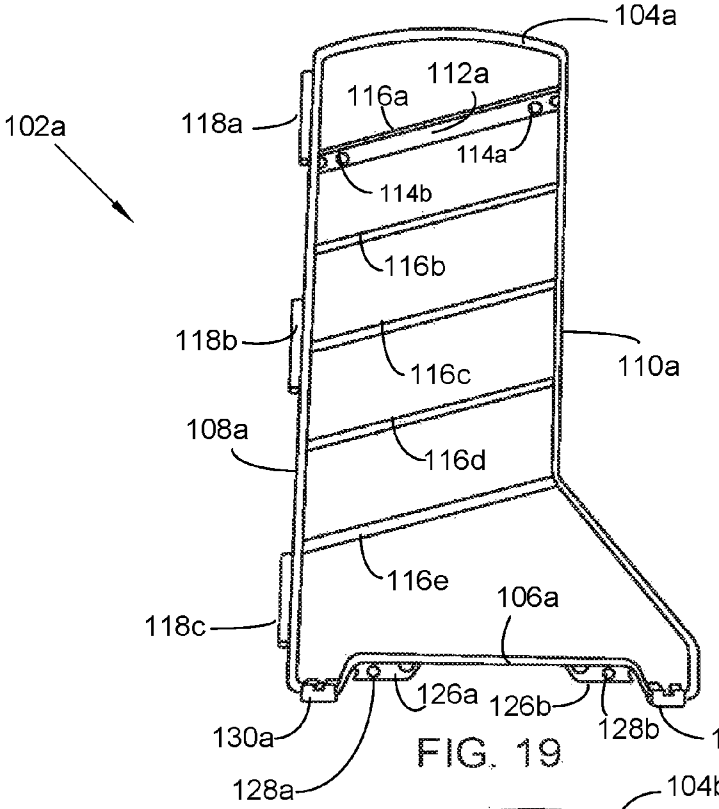
FIG. 19 illustrates a side view of an exemplary left side frame, in accordance with an embodiment of the present invention.
Figure 22:
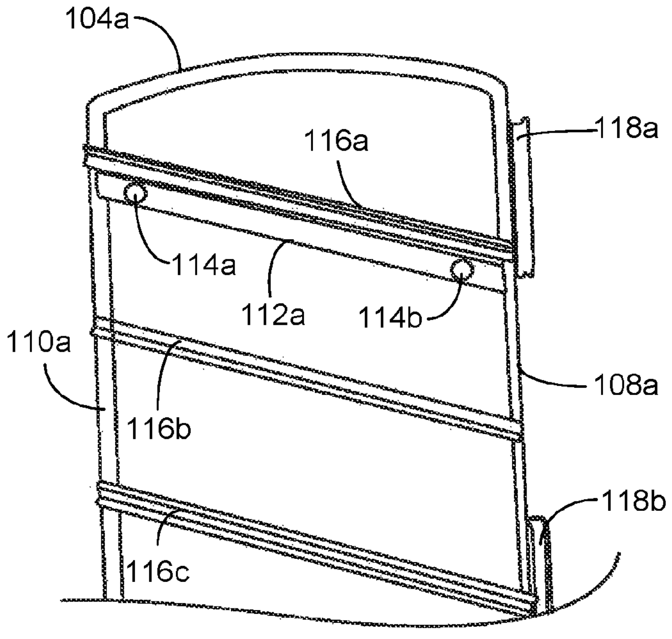
FIG. 22 illustrates a close up view of an upper region of the left side frame, in accordance with an embodiment of the present invention.

Looking ahead to FIG. 19, the side frames 102*a*, 102*b* are defined by a top bar 104*a*, 104*b*, a bottom bar 106*a*, 106*b*, a straight lateral bar 108*a*, 108*b*, and a bent lateral bar 110*a*, 110*b*. The bars 104*a-b*, 106*a-b*, 108*a-b*, 110*a-b* join in a coplanar relationship to form a generally tapered, rectangular shape. The junction between the bars may be welded, as shown in FIG. 22, or coupled through a friction fit relationship. The bottom bar 106*a*, 106*b* of the pair of side frames 102*a*, 102*b* is disposed towards a ground surface. The top bar 104*a*, 104*b* is disposed opposite the bottom bar 106*a*, 106*b*.

In one embodiment shown back in FIG. 3, the bottom bar 106*a*, 106*b* is defined by a hump 168. The hump 168 may have a generally convex shape. The bent lateral bar 110*a*, 110*b* deviates the rectangular shape, so as to form a wider lower end for the side frames 102*a*, 102*b*. In this manner, the upper region of the side frame is narrow and rectangular, while the lower region disposed towards the ground surface is bent out and wider.

Figure 6:
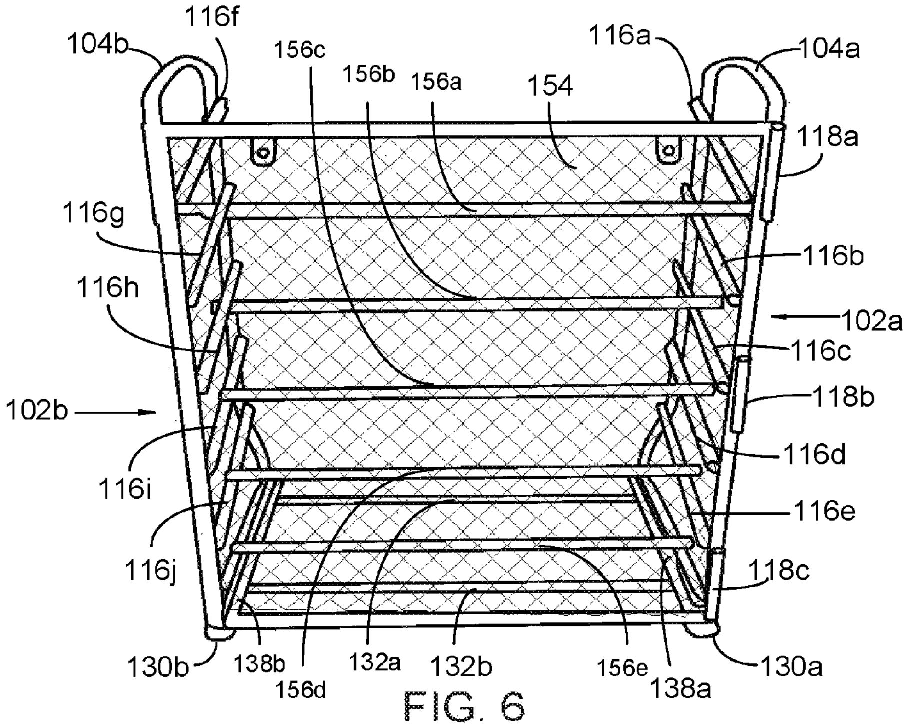
FIG. 6 illustrates a rear perspective view of a vertical file organizing assembly with the shelves removed, in accordance with an embodiment of the present invention.

Turning now to FIG. 6, the assembly 100 may include a plurality of sleeves 118*a-f* configured to join with the straight lateral bar 108*a*, 108*b* in a generally parallel relationship. The sleeves 118*a-f* are configured to receive a rear panel 146, described below. The sleeves 118*a-f* may be disposed in a vertical orientation so that the rear panel 146 can be slidably pulled out or slid into the sleeves 118*a-f*.

Figure 11:
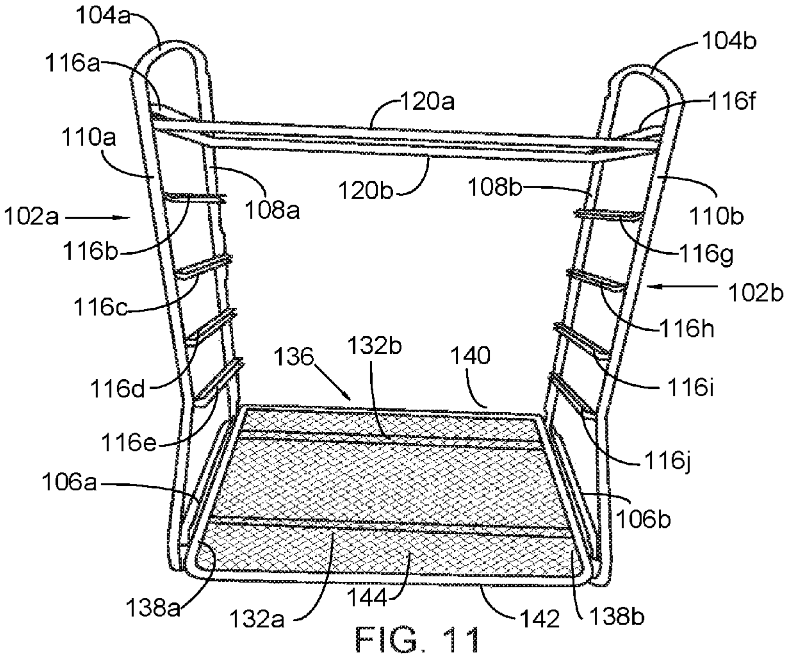
FIG. 11 illustrates a front perspective view of a vertical file organizing assembly with the shelves removed, in accordance with an embodiment of the present invention.
Figure 12:
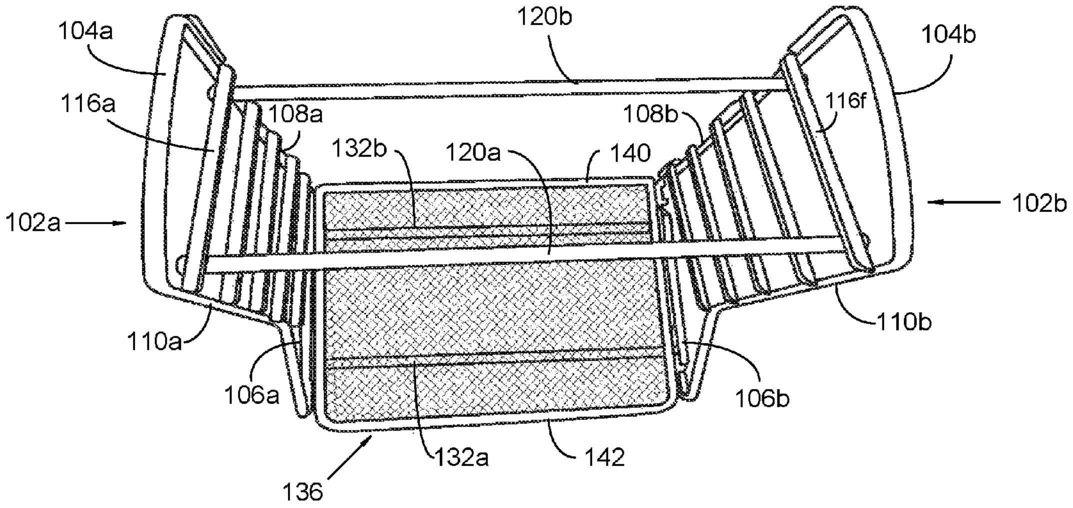
FIG. 12 illustrates a top perspective view of a vertical file organizing assembly with the shelves removed, in accordance with an embodiment of the present invention.

As FIG. 11 illustrates, the assembly 100 may include a pair of frame bars 112*a*, 112*b* that traverse the assembly 100 to enhance structural integrity of the side frames 102*a*, 102*b* and also provide a mounting surface for a pair of top crossbars 120*a*, 120*b*, as discussed below. The frame bars 112*a*, 112*b* are defined by a plurality of holes 114*a-d* useful for fastening. In one embodiment, the frame bars 112*a*, 112*b* extend between the straight lateral bar 108*a*, 108*b* and the bent lateral bar 110*a*, 110*b* at an angle, such that the frame bars 112*a*, 112*b* slope down from the bent lateral bar 110*a*, 110*b* to the straight lateral bar 108*a*, 108*b* (FIG. 12).

Figure 13:
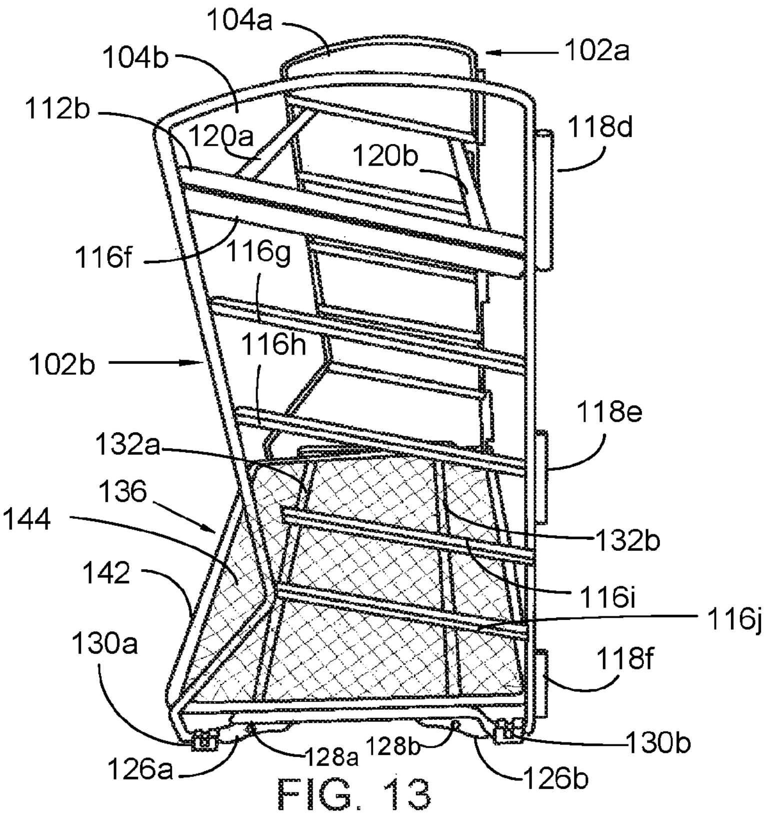
FIG. 13 illustrates a side perspective view of a vertical file organizing assembly with the shelves removed, in accordance with an embodiment of the present invention.
Figure 14:
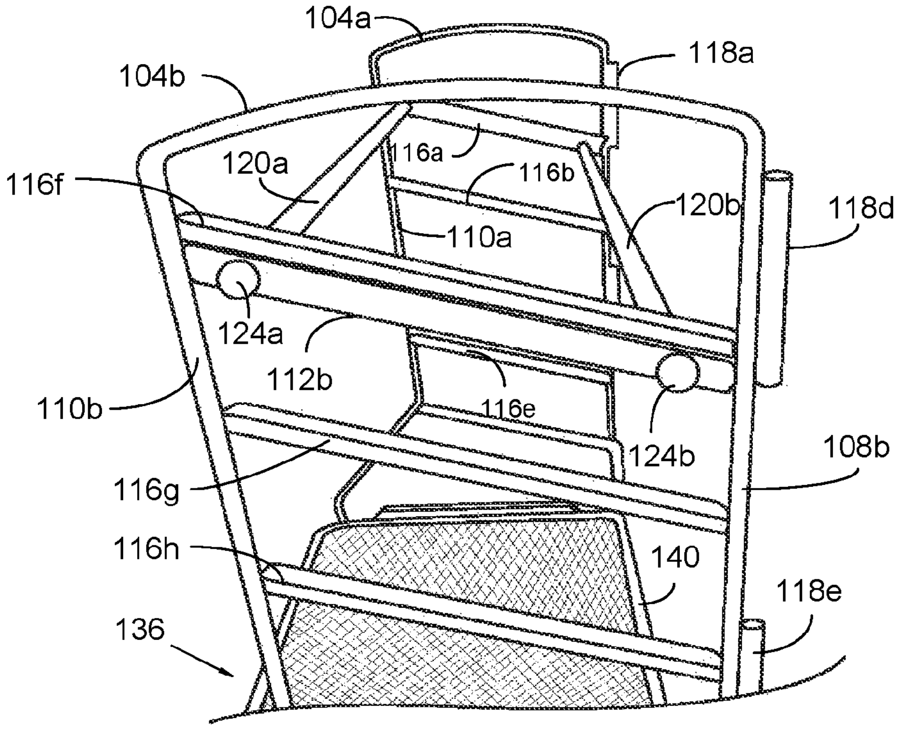
FIG. 14 illustrates a close up view of an exemplary threaded terminus for a pair of top crossbars, in accordance with an embodiment of the present invention.

As shown in the top view of FIG. 13, the assembly 100 may include a pair of top crossbars 120*a*, 120*b* that are configured to extend between the frame bars 112*a*, 112*b*. The top crossbars 120*a*, 120*b* may include a threaded top termini 124*a*, 124*b* that is in general alignment with the holes 114*a-d* formed in the frame bars 112*a*, 112*b* (FIG. 14). At least one fastener 122, such as a threaded screw may be used to fasten the top crossbars 120*a*, 120*b* at their termini to the frame bars 112*a*, 112*b* bar. The top crossbars 120*a*, 120*b* are disposed in a parallel, spaced-apart relationship when traversing the side frames 102*a*, 102*b*, so as to enhance structural integrity of the assembly 100.

Figure 15A:
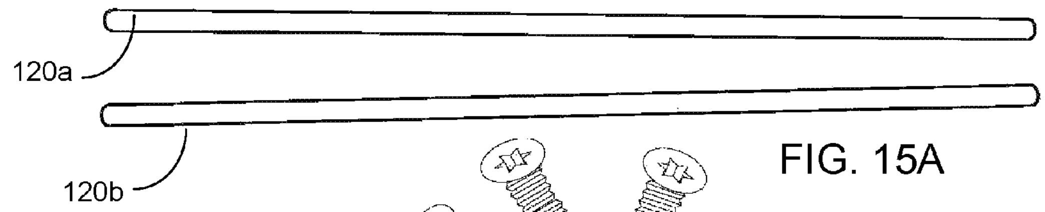
FIG. 15A illustrates a perspective view of a pair of top crossbars and FIG. 15B illustrates at least one fastener, in accordance with an embodiment of the present invention.
Figure 15B:
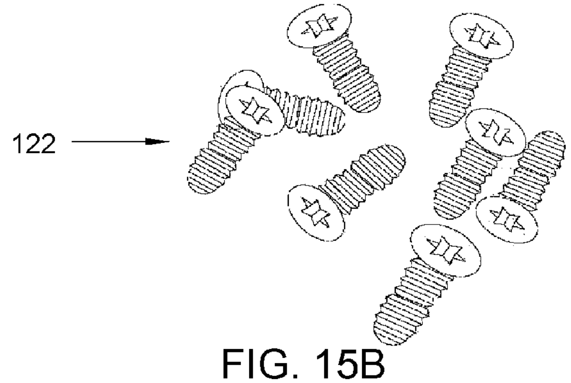
Figure 16:
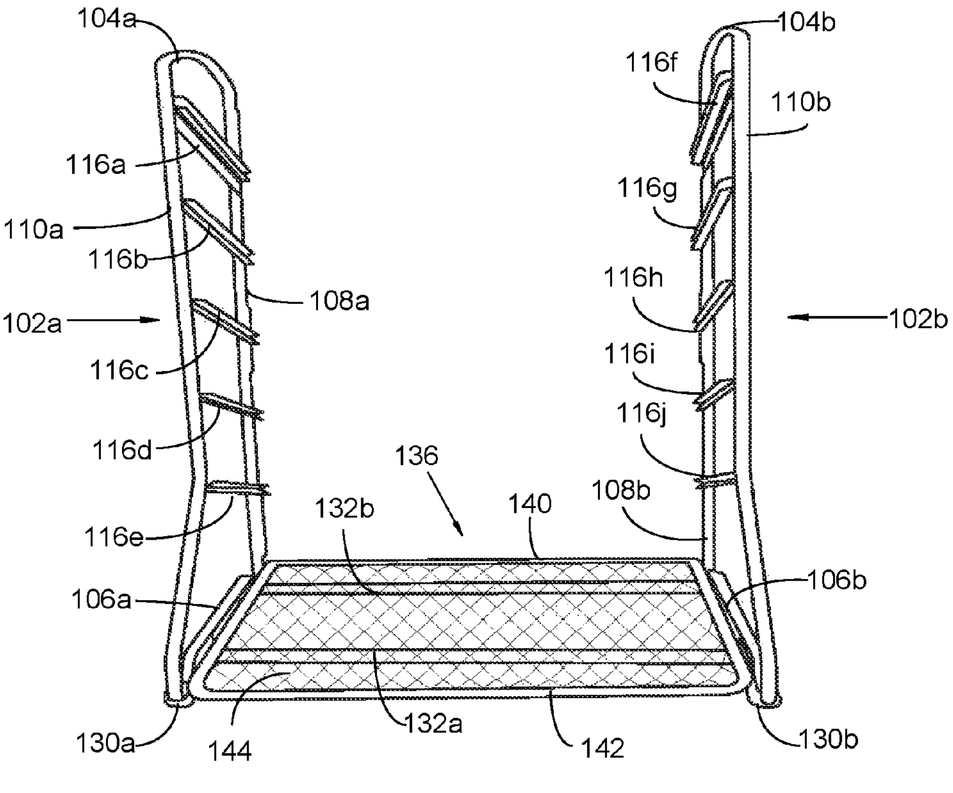
FIG. 16 illustrates a front perspective view of vertical file organizing assembly with the shelves removed, in accordance with an embodiment of the present invention.
Figure 17:
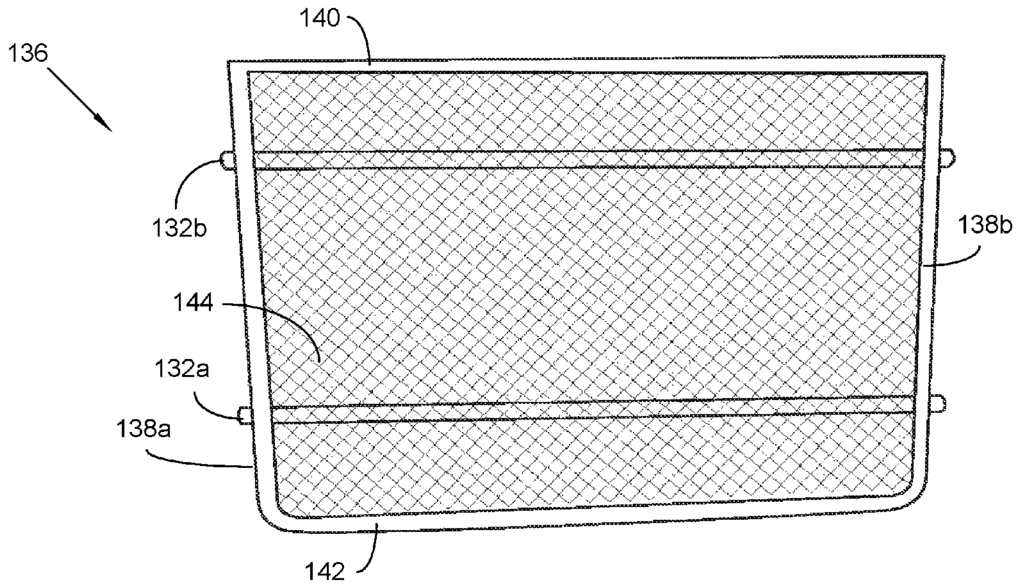
FIG. 17 illustrates a top view of an exemplary base panel, in accordance with an embodiment of the present invention.

FIG. 15A illustrates a pair of exemplary top crossbars 120*a*, 120*b*, and FIG. 15B illustrates a fasteners 122, such as threaded screws used to fasten the top crossbars 120*a*, 120*b* through the threaded termini 124*a*, 124*b*. However ion other embodiments, any type of fastener may be used for fastening the top crossbars 120*a*, 120*b* to the side frames 102*a*, 102*b*.

Figure 20:
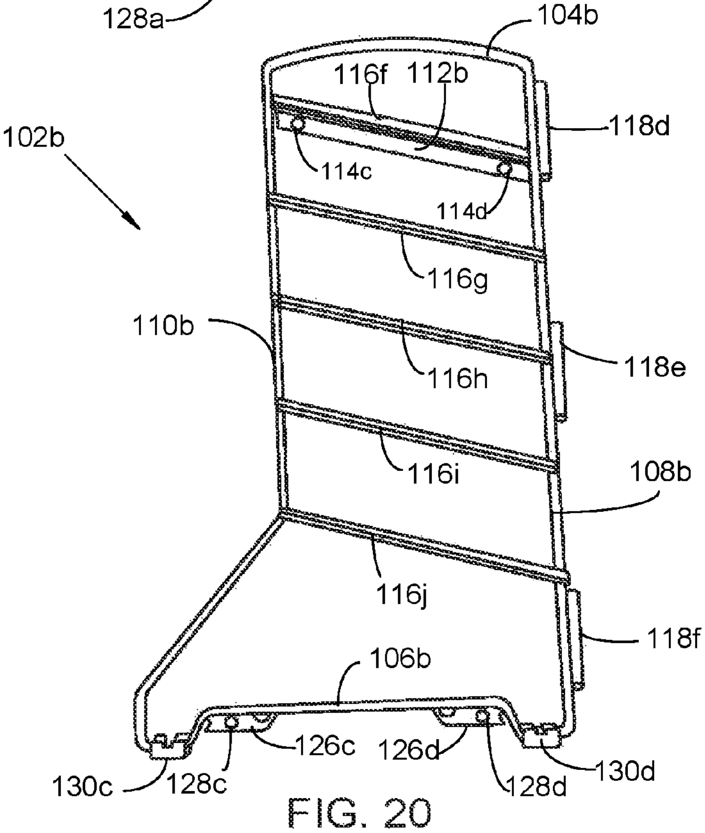
FIG. 20 illustrates a side view of an exemplary right side frame, in accordance with an embodiment of the present invention.
Figure 21:
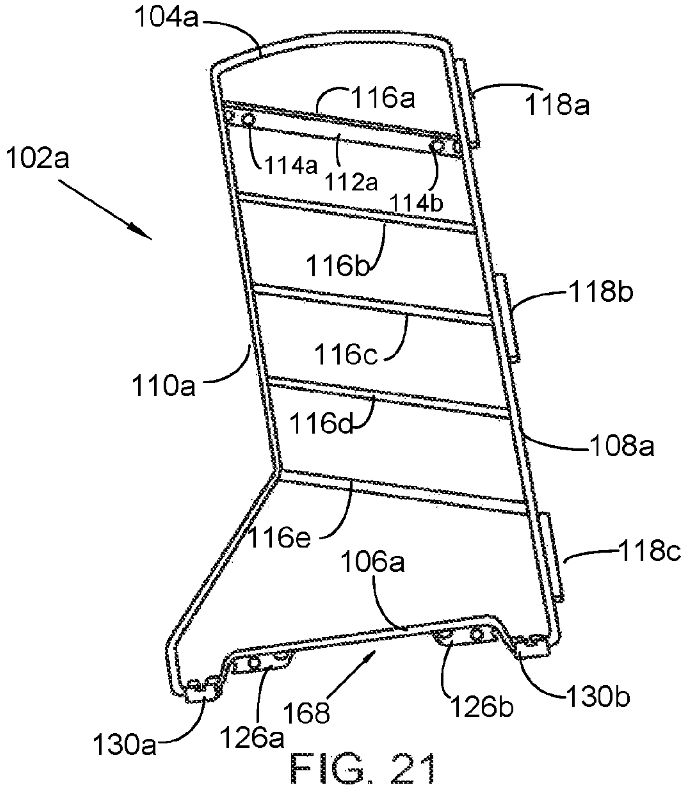
FIG. 21 illustrates a side view of the left side frame shown in FIG. 19 flipped over, in accordance with an embodiment of the present invention.
Figure 23:
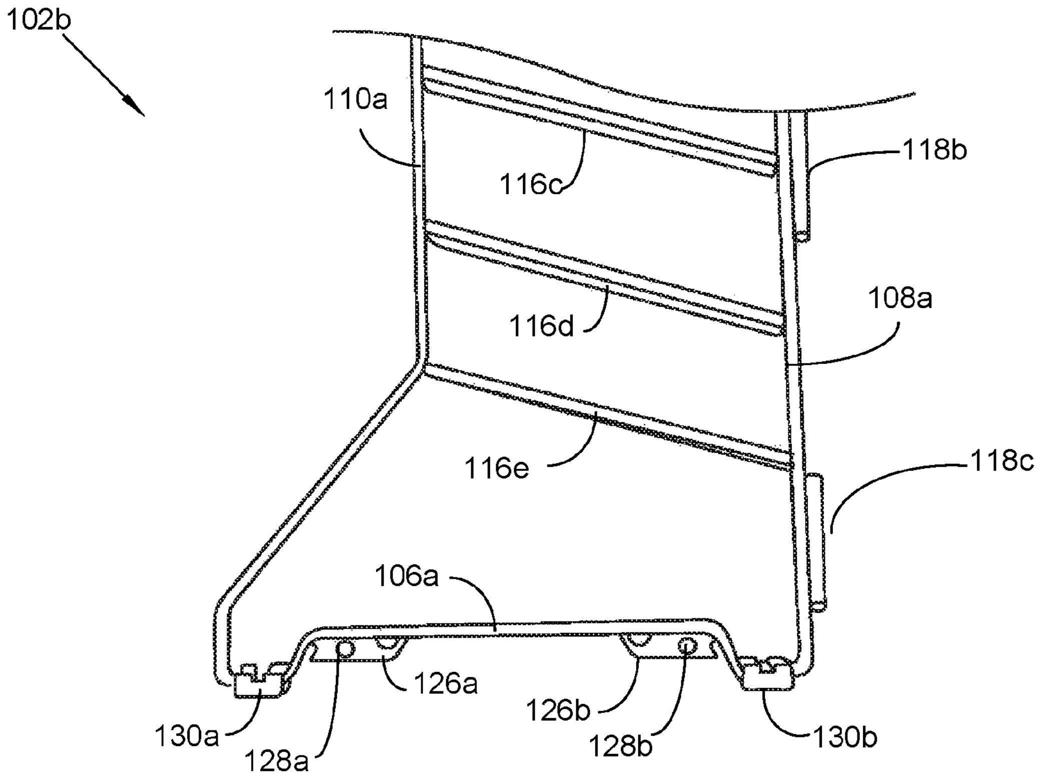
FIG. 23 illustrates a close up view of a lower region of the left side frame, in accordance with an embodiment of the present invention.

Looking ahead at FIG. 19, the assembly 100 may include at least one flange 126*a*, 126*b*, 126*c*, 126*d* that joins with each bottom bar 106*a*, 106*b* of the side frames 102*a*, 102*b*. In one embodiment, the flange 126*a-d* extends downwardly from the bottom bar 106*a*, 106*b*. The flange 126*a-d* may be defined by at least one aperture 128*a*, 128*b*, 128*c*, 128*d*, as shown in FIGS. 20 and 21. The aperture 128*a-d* in the flange 126*a-d* provides a passage for passing at least one fastener 122 through (FIG. 23). The fastener 122 is used to connect a pair of bottom crossbars 132*a*, 132*b* across the side frames 102*a*, 102*b*.

Looking ahead again to FIG. 21, the bottom crossbars 132*a*, 132*b* may extend between the pair of side frames 102*a*, 102*b* at the bottom bar 106*a*, 106*b*. The bottom crossbars 132*a*, 132*b* may include a threaded bottom termini 134*a-d* that is in general alignment with the at least one aperture 128*a-d* formed in the flange 126*a-d*. At least one fastener 122, such as a threaded screw may be used to fasten the bottom crossbars 132*a*, 132*b* at their termini 134*a-d* to the bottom bar 106*a*, 106*b*. The bottom crossbars 132*a*, 132*b* are disposed in a parallel, spaced-apart relationship when traversing the side frames 102*a*, 102*b*, so as to enhance structural integrity of the assembly 100.

In some embodiments, the assembly 100 may include a plurality of feet 130*a*, 130*b*, 130*c*, 130*d* configured to join with the bottom bar 106*a*, 106*b* for each side frame 102*a*, 102*b*. The feet 130*a-d* rest on a ground surface to help stabilize the assembly 100. The feet 130*a-d* may include rubber cubes having a lateral opening to enable passage of the bottom bar 106*a*, 106*b*. Though the feet 130*a-d* may include any stabilizing member known in the art. In one embodiment, the plurality of feet 130*a-d* comprise two feet 130*a-d* for each bottom bar 106*a*, 106*b* of the respective side frame.

Figure 18:
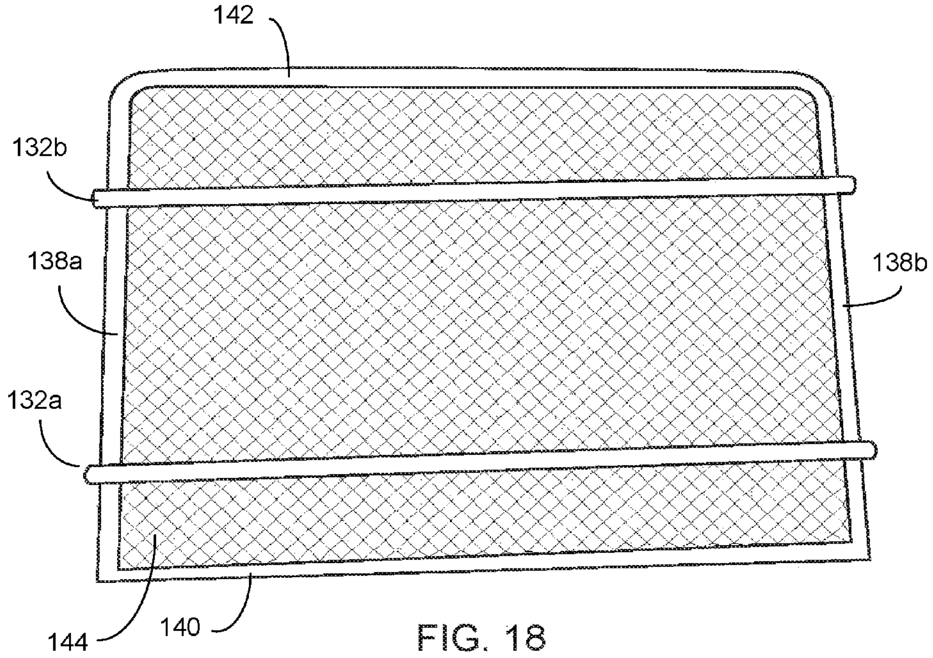
FIG. 18 illustrates a bottom view of an exemplary base panel, in accordance with an embodiment of the present invention.

Turning back to FIGS. 16 and 17, the assembly 100 may include a base panel 136. The base panel 136 positions over the pair of bottom crossbars 132*a*, 132*b*, resting atop the bottom crossbars 132*a*, 132*b*. The base panel 136 forms the lowermost surface of the assembly 100. The base panel 136 is defined by a pair of side edges 138*a*, 138*b*, a rear edge 140, a front edge 142, and a base wire mesh 144 disposed between the edges 138*a-b*, 140, 142 (FIG. 18). The base panel 136 is configured to rest over the pair of bottom crossbars 132*a*, 132*b* in a generally coplanar relationship. The base panel 136 may be used to carry at least one item in a horizontal disposition, serving as a supplemental shelf with the sloped shelves 158*a-e*.

Figure 8:
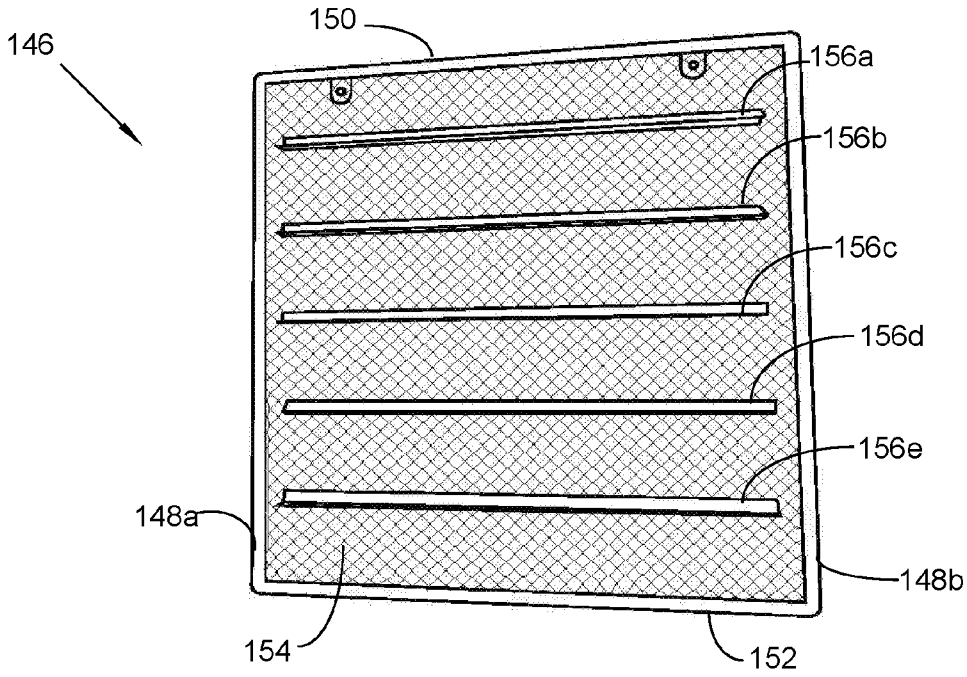
FIG. 8 illustrates a front view of a rear panel having a plurality of rails, in accordance with an embodiment of the present invention.
Figure 9:
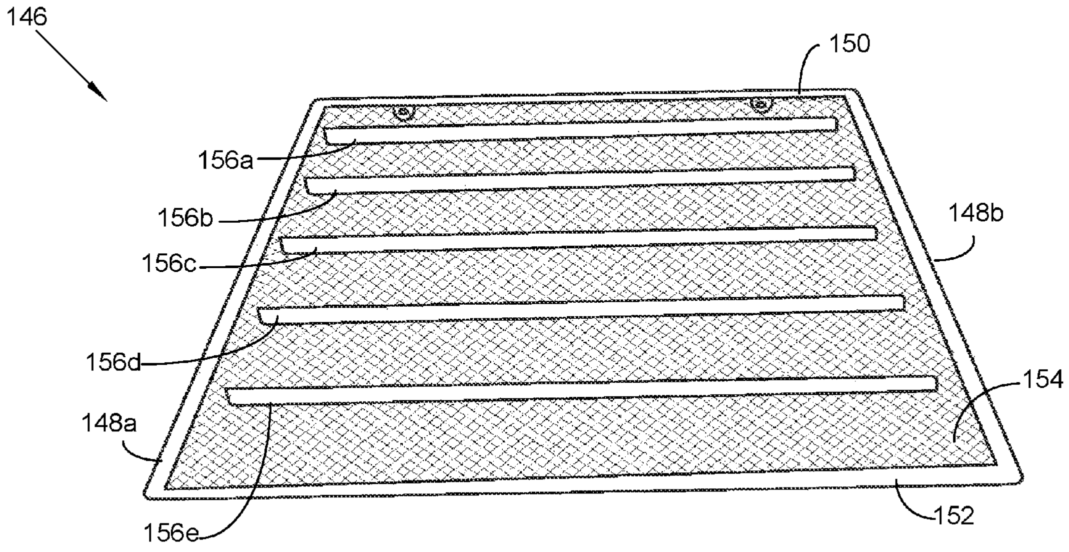
FIG. 9 illustrates a perspective view of a rear panel having a plurality of rails, in accordance with an embodiment of the present invention.
Figure 10:
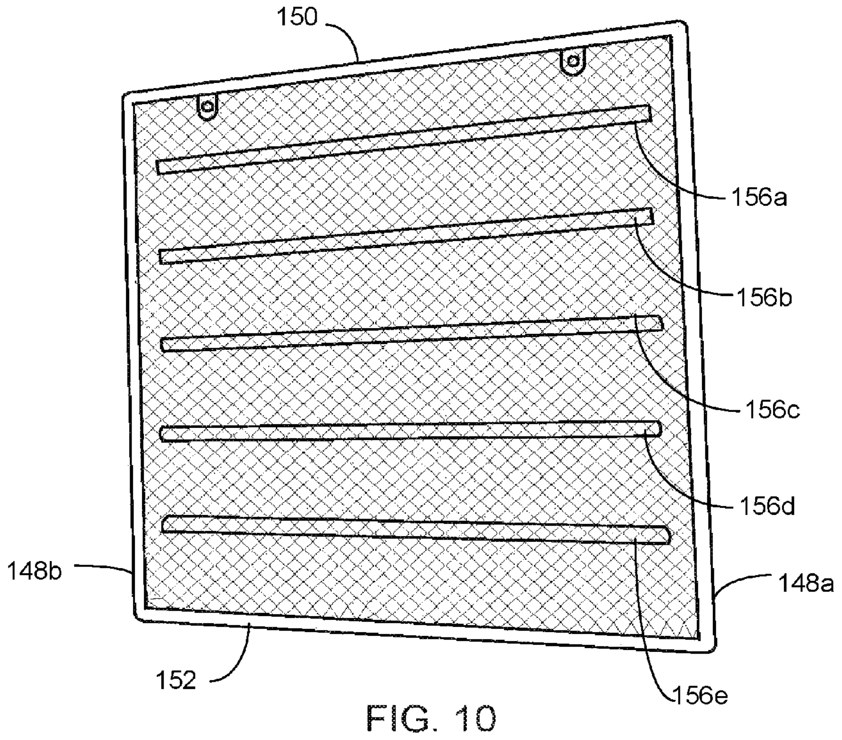
FIG. 10 illustrates a rear view of a rear panel having a plurality of rails, in accordance with an embodiment of the present invention.

Looking back at FIGS. 8 and 9, the assembly 100 may include a rear panel 146 defined by a pair of lateral edges 148*a*, 148*b*, a top edge 150, a bottom edge 152, and a rear wire mesh 154 disposed between the edges (FIG. 10). The rear panel 146 is disposed to extend generally perpendicular between the pair of side frames 102*a*, 102*b*.

As FIG. 7 illustrates, the rear panel 146 assembles and disassembles from the assembly 100 through the slidable engagement with the plurality of sleeves 118*a-f* along the straight lateral bar 108*a*, 108*b*. However in other embodiments, the rear panel 146 may detach through a friction fit relationship, or through various types of fasteners known in the art.

Turning back to FIG. 5, the assembly 100 comprises a plurality of channels 116*a-j* configured to extend between the straight lateral bar 108*a*, 108*b* and the bent lateral bar 110*a*, 110*b* at an angle. In this manner, the channels 116*a-j* slope down from the bent lateral bar 110*a*, 110*b* to the straight lateral bar 108*a*, 108*b*. In one embodiment, the channels 116*a-j* are generally parallel with the frame bars 112*a*, 112*b*. The channels 116*a-j* provide a slidable surface that receives a plurality of shelves 158*a-e*, described below. In one embodiment, a left side frame 102 may join with five channels 116*a*, 116*b*, 116*c*, 116*d*, 116*e*, while a right side frame may join with five additional channels 116*f*, 116*g*, 116*h*, 116*i*, 116*j*.

In some embodiments, the assembly 100 may include a plurality of shelves 158*a-e* defined by a front shaft 160, a rear shaft 162, a pair of lateral shafts 164*a*, 164*b*. In some embodiments, a shelf wire mesh 166 may be disposed between the shafts 160, 162, 164*a*, 164*b*. The shelf wire mesh 166 has sufficient surface area to support the at least one item.

The shelves 158*a-e* slidably engage the channels 116*a-j* to form a tiered arrangement of sloped shelves 158*a-e*. The channels 116*a-j* are referenced in FIG. 20. In one embodiment, the wire mesh 166 of the shelves 158*a-e* has sufficient surface area to carry at least one item, such as paper, files, writing instruments, and office supplies. The angled disposition of the channels 116*a-j* causes the shelves 158*a-e* to slope down from the bent lateral bar 110*a*, 110*b* to the straight lateral bar 108*a*, 108*b*. In this manner, the items are held in the shelf through gravity.

The sliding engagement between the shelves 158*a-e* and channels 116*a-j* also facilitates removal of at least one of the shelves 158*a-e* from the channels 116*a-j*, so as to form various combinations of shelving in the assembly 100. The pair of lateral shafts 164*a*, 164*b* on the shelves 158*a-e* slidably engage the sloped channels 116*a-j* that extend across the lateral bars. In this manner, both the channel support the shelves 158*a-e* in a sloped disposition.

In addition to engaging the channels 116*a-j*, the rear shaft 162 of the shelves 158*a-e* abuts against a plurality of rails 156*a-e* joined with the rear wire mesh 154 of the rear panel 146. The rails 156*a-e* extend between the pair of lateral edges 148*a*, 148*b* of the rear panel 146. The rails 156*a-e* join with the rear wire mesh 154 in a parallel, spaced-apart relationship. The rails 156*a-e* are disposed along the rear wire mesh 154 of the rear panel 146, positioned to receive the rear shaft 162 of the shelves 158*a-e*. The rails provide additional support the shelves 158*a-e*. In one embodiment, the rails 156*a-e* form a generally L-shape. In another embodiment, five rails 156*a-e* are utilized to correlate with five shelves 158*a-e*. Though in other embodiments, any number of rails 156*a-e*, channels 116*a-j*, and shelves 158*a-e* may be used.

Through this interlocking relationship between panels, the rear panel 146, the pair of side frames 102*a*, 102*b*, and the rear panel 146 are easily assembled to form an organizer having sufficient surface area and volume for containing the at least one flat item. Minimal tools and fasteners are required to construct the assembly 100. Further, the base panel 136, the pair of side frames 102*a*, 102*b*, and the rear panel 146 are configured to collapse in a coplanar relationship to enable stowage and shipping. Because the panels are collapsible, the assembly 100 requires less space for a consumer to store the assembly 100, but also the shipping and packaging costs are reduced since the assembly 100 requires less space, and therefore less packing material.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A vertical file organizing assembly, the assembly comprising:

a pair of side frames defined by a top bar, a bottom bar, a straight lateral bar, and a bent lateral bar, the bars configured to join in a coplanar relationship, so as to form a generally tapered, rectangular shape;

a pair of frame bars having by a plurality of holes, the pair of frame bars configured to extend between the straight lateral bar and the bent lateral bar at an angle, such that the pair of frame bars slope down from the bent lateral bar to the straight lateral bar;

a plurality of channels configured to extend between the straight lateral bar and the bent lateral bar at an angle, such that the plurality of channels slope down from the bent lateral bar to the straight lateral bar;

a plurality of sleeves configured to be joined with the straight lateral bar in a generally parallel relationship;

a pair of top crossbars configured to extend between the pair of frame bars in general alignment with the plurality of holes formed in the pair of frame bars, the pair of top crossbars disposed in a generally parallel, spaced-apart relationship;

at least one flange having at least one aperture, the at least one flange configured to be joined with the bottom bar;

a plurality of feet configured to be joined with the bottom bar, the plurality of feet configured to enhance stability of the assembly;

a pair of bottom crossbars configured to extend between the pair of side frames at the bottom bar in general alignment with the at least one aperture formed in the flange, the pair of bottom crossbars disposed in a parallel, spaced-apart relationship;

a base panel defined by a pair of side edges, a rear edge, a front edge, and a base wire mesh disposed between the edges, the base panel configured to be joined with the pair of bottom crossbars in a generally coplanar relationship;

a rear panel defined by a pair of lateral edges, a top edge, a bottom edge, and a rear wire mesh disposed between the edges, the pair of lateral edges configured to slidably engage the plurality of sleeves, such that the rear panel is disposed to extend generally perpendicular between the pair of side frames;

a plurality of rails configured to be joined with the rear wire mesh, the plurality of rails further disposed to extend between the pair of lateral edges of the rear panel, the plurality of rails disposed in a parallel, spaced-apart relationship; and a plurality of shelves defined by a front shaft, a rear shaft, a pair of lateral shafts, and a shelf wire mesh disposed between the shafts, the pair of lateral shafts configured to slidably engage the plurality of channels extending across the lateral bars, the rear shaft configured to abut against the plurality of rails joined with the rear wire mesh of the rear panel, whereby the angled disposition of the plurality of channels causes the plurality of shelves to slope down from the bent lateral bar to the straight lateral bar, whereby the horizontal disposition of the plurality of rails inhibits slippage by the plurality of shelves.

2. The assembly of claim 1, wherein the base panel is generally rectangular and flat.

3. The assembly of claim 1, wherein the base panel is positioned adjacent and coplanar to the pair of bottom crossbars.

4. The assembly of claim 1, wherein the bottom bar of the pair of side frames having a hump.

5. The assembly of claim 1, wherein the pair of top crossbars are disposed at different elevations in correlation to the slope of the pair of frame bars.

6. The assembly of claim 1, wherein the rear panel is generally rectangular and flat.

7. The assembly of claim 1, wherein the plurality of rails have a generally L-shape.

8. The assembly of claim 1, wherein the plurality of rails comprises five rails.

9. The assembly of claim 1, wherein the plurality of shelves comprises five shelves.

10. The assembly of claim 1, further comprising more than one fastener.

11. The assembly of claim 10, wherein the at least one fastener comprises a threaded screw.

12. The assembly of claim 11, wherein the pair of top crossbars are defined by a threaded top termini.

13. The assembly of claim 12, wherein the more than one fastener is configured to pass through the plurality of holes formed in the pair of frame bars and the threaded top termini of the pair of top crossbars for fastening the pair of top crossbars to the pair of frame bars.

14. The assembly of claim 13, wherein the pair of bottom crossbars have a threaded bottom termini.

15. The assembly of claim 14, wherein the more than one fastener is configured to pass through the at least one aperture formed in the flange and the threaded bottom termini of the pair of bottom crossbars for fastening the pair of bottom crossbars to the pair of side frames at the bottom bar.

16. A vertical file organizing assembly, the assembly comprising:

a pair of side frames defined by a top bar, a bottom bar having a hump, a straight lateral bar, and a bent lateral bar, the bars configured to be joined in a coplanar relationship, so as to form a generally tapered, rectangular shape;

a pair of frame bars having by a plurality of holes, the pair of frame bars configured to extend between the straight lateral bar and the bent lateral bar at an angle, such that the pair of frame bars slope down from the bent lateral bar to the straight lateral bar;

a plurality of channels configured to extend between the straight lateral bar and the bent lateral bar at an angle, such that the plurality of channels slope down from the bent lateral bar to the straight lateral bar;

a plurality of sleeves configured to be joined with the straight lateral bar in a generally parallel relationship;

a pair of top crossbars configured to extend between the pair of frame bars in general alignment with the plurality of holes formed in the pair of frame bars, the pair of top crossbars disposed in a generally parallel, spaced-apart relationship, the pair of top crossbars having a threaded top termini;

at least one flange having at least one aperture, the at least one flange configured to be joined with the bottom bar;

a plurality of feet configured to be joined with the bottom bar, the plurality of feet configured to enhance stability of the assembly;

a pair of bottom crossbars configured to extend between the pair of side frames at the bottom bar in general alignment with the at least one aperture formed in the flange, the pair of bottom crossbars disposed in a parallel, spaced-apart relationship, the pair of bottom crossbars having a threaded bottom termini;

a base panel defined by a pair of side edges, a rear edge, and a front edge, the base panel configured to be joined the pair of bottom crossbars in a generally coplanar relationship;

a rear panel defined by a pair of lateral edges, a top edge, and a bottom edge, the pair of lateral edges configured to slidably engage the plurality of sleeves, such that the rear panel is disposed to extend generally perpendicular between the pair of side frames;

a plurality of rails configured to be joined with the rear wire mesh, the plurality of rails further disposed to extend between the pair of lateral edges of the rear panel, the plurality of rails disposed in a parallel, spaced-apart relationship;

a plurality of shelves defined by a front shaft, a rear shaft, and a pair of lateral shafts, the pair of lateral shafts configured to slidably engage the plurality of channels extending across the lateral bars, the rear shaft configured to abut against the plurality of rails joined with the rear wire mesh of the rear panel, whereby the angled disposition of the plurality of channels causes the plurality of shelves to slope down from the bent lateral bar to the straight lateral bar, whereby the horizontal disposition of the plurality of rails inhibits slippage by the plurality of shelves; and more than one fastener.

17. The assembly of claim 16, wherein the plurality of shelves each comprise a shelf wire mesh.

18. The assembly of claim 16, wherein the plurality of shelves each comprise five shelves.

19. The assembly of claim 16, wherein the more than one fastener is configured to pass through the plurality of holes formed in the pair of frame bars and the threaded top termini of the pair of top crossbars for fastening the pair of top crossbars to the pair of frame bars.

20. The assembly of claim 19, wherein the more than one fastener is configured to pass through the at least one aperture formed in the flange and the threaded bottom termini of the pair of bottom crossbars for fastening the pair of bottom crossbars to the pair of side frames at the bottom bar.

* * * * *